(12) United States Patent
Whited et al.

(10) Patent No.: US 7,937,485 B2
(45) Date of Patent: May 3, 2011

(54) STREAMING GATEWAY

(75) Inventors: William Albert Whited, Atlanta, GA (US); Michael Duckett, Dacula, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 983 days.

(21) Appl. No.: 11/129,530

(22) Filed: May 13, 2005

(65) Prior Publication Data

US 2006/0047845 A1 Mar. 2, 2006

Related U.S. Application Data

(60) Provisional application No. 60/605,994, filed on Aug. 31, 2004.

(51) Int. Cl.
*G06F 15/16* (2006.01)
*G06F 17/00* (2006.01)
(52) U.S. Cl. .................. 709/231; 709/203; 370/316
(58) Field of Classification Search .................. 709/231; 715/500.1; 370/316
See application file for complete search history.

(56) References Cited

U.S. PATENT DOCUMENTS

| | | |
|---|---|---|
| 4,935,951 A | 6/1990 | Robinson |
| 4,993,058 A | 2/1991 | McMinn |
| 5,012,507 A | 4/1991 | Leighton |
| 5,161,180 A | 11/1992 | Chavous |
| RE34,677 E | 7/1994 | Ray et al. |
| 5,511,111 A | 4/1996 | Serbetcioglu et al. |
| 5,526,406 A | 6/1996 | Luneau |
| 5,572,576 A | 11/1996 | Klausner et al. |
| 5,621,379 A | 4/1997 | Collins |
| 5,673,304 A | 9/1997 | Connor |
| 5,724,412 A | 3/1998 | Srinivasan |
| 5,796,806 A | 8/1998 | Birckbichler |
| 5,805,587 A | 9/1998 | Norris |
| 5,883,942 A | 3/1999 | Lim et al. |
| 5,940,474 A | 8/1999 | Ruus |
| 5,940,475 A | 8/1999 | Hansen |
| 5,999,525 A | 12/1999 | Krishnaswamy |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath |
| 6,208,718 B1 | 3/2001 | Rosenthal |
| 6,208,726 B1 | 3/2001 | Bansal |
| 6,215,993 B1 | 4/2001 | Ulveland |
| 6,219,413 B1 | 4/2001 | Burg |
| 6,259,692 B1 | 7/2001 | Shtivelman |
| 6,307,920 B1 | 10/2001 | Thomson |
| 6,310,946 B1 | 10/2001 | Bauer |
| 6,343,115 B1 | 1/2002 | Foladare et al. |

(Continued)

OTHER PUBLICATIONS

U.S. Appl. No. 11/318,110, filed Dec. 2005.

(Continued)

*Primary Examiner* — Jeffrey Pwu
*Assistant Examiner* — Sulaiman Nooristany
(74) *Attorney, Agent, or Firm* — Cantor Colburn LLP

(57) ABSTRACT

The exemplary embodiments describe methods, systems, and products that intelligently translate between streaming formats. One such method receives a multimedia stream of data, with the multimedia stream of data having a streaming protocol. Network control data is received and indicates a level of demand for the multimedia stream of data. The multimedia stream of data is translated to a different streaming protocol to reduce bandwidth. The translated multimedia stream of data is then forwarded to a transport network.

17 Claims, 6 Drawing Sheets

U.S. PATENT DOCUMENTS

| | | |
|---|---|---|
| 6,347,136 B1 | 2/2002 | Horan |
| 6,356,756 B1 | 3/2002 | Koster |
| 6,418,473 B1 * | 7/2002 | St. Maurice et al. .......... 709/231 |
| 6,434,126 B1 | 8/2002 | Park |
| 6,476,763 B2 | 11/2002 | Allen |
| 6,512,776 B1 | 1/2003 | Jones |
| 6,529,500 B1 | 3/2003 | Pandharipande |
| 6,529,726 B1 | 3/2003 | Rhodes |
| 6,584,082 B1 * | 6/2003 | Willis et al. ................... 370/316 |
| 6,603,977 B1 | 8/2003 | Walsh |
| 6,608,886 B1 | 8/2003 | Contractor |
| 6,622,016 B1 | 9/2003 | Sladek et al. |
| 6,624,754 B1 | 9/2003 | Hoffman |
| 6,661,785 B1 | 12/2003 | Zhang |
| 6,665,388 B2 | 12/2003 | Bedingfield |
| 6,665,611 B1 | 12/2003 | Oran |
| 6,674,745 B1 | 1/2004 | Schuster |
| 6,678,357 B2 | 1/2004 | Stumer |
| 6,680,998 B1 | 1/2004 | Bell |
| 6,703,930 B2 | 3/2004 | Skinner |
| 6,704,576 B1 * | 3/2004 | Brachman et al. ............ 455/503 |
| 6,718,021 B2 | 4/2004 | Crockett et al. |
| 6,724,872 B1 | 4/2004 | Moore |
| 6,771,742 B2 | 8/2004 | McCalmont et al. |
| 6,792,081 B1 | 9/2004 | Contractor |
| 6,804,338 B1 | 10/2004 | Chen |
| 6,816,481 B1 | 11/2004 | Adams |
| 6,842,448 B1 | 1/2005 | Norris |
| 6,868,074 B1 | 3/2005 | Hanson |
| 6,912,399 B2 | 6/2005 | Zirul et al. |
| 6,931,117 B2 | 8/2005 | Roberts |
| 6,940,950 B2 | 9/2005 | Dickinson |
| 2001/0042253 A1 * | 11/2001 | Jung ............................... 725/91 |
| 2002/0072348 A1 | 6/2002 | Wheeler et al. |
| 2002/0160745 A1 | 10/2002 | Wang |
| 2003/0126197 A1 * | 7/2003 | Black et al. ................... 709/203 |
| 2003/0211839 A1 | 11/2003 | Baum |
| 2003/0216148 A1 | 11/2003 | Henderson |
| 2004/0008680 A1 | 1/2004 | Moss |
| 2004/0037403 A1 | 2/2004 | Koch |
| 2004/0057425 A1 | 3/2004 | Brouwer |
| 2004/0101123 A1 | 5/2004 | Garcia |
| 2004/0125818 A1 * | 7/2004 | Richardson et al. .......... 370/432 |
| 2004/0128694 A1 | 7/2004 | Bantz |
| 2004/0140928 A1 | 7/2004 | Cleghorn |
| 2004/0170159 A1 | 9/2004 | Kim |
| 2004/0194143 A1 | 9/2004 | Hirose |
| 2004/0226045 A1 | 11/2004 | Nadarajah |
| 2004/0233907 A1 | 11/2004 | Hundscheidt |
| 2004/0258003 A1 * | 12/2004 | Kokot et al. ................... 370/254 |
| 2005/0007969 A1 | 1/2005 | Hundscheidt |
| 2005/0047574 A1 | 3/2005 | Reid |
| 2005/0063519 A1 | 3/2005 | James |
| 2005/0132264 A1 * | 6/2005 | Joshi et al. .................. 715/500.1 |
| 2005/0151642 A1 | 7/2005 | Tupler |
| 2005/0175166 A1 | 8/2005 | Welenson |
| 2005/0190750 A1 | 9/2005 | Kafka |
| 2005/0190892 A1 | 9/2005 | Dawson |
| 2005/0232243 A1 | 10/2005 | Adamczyk et al. |
| 2005/0250468 A1 | 11/2005 | Lu |
| 2005/0256926 A1 * | 11/2005 | Muhonen et al. ............. 709/205 |

OTHER PUBLICATIONS

US 5,905,788, 05/1999, Bauer (withdrawn)

* cited by examiner

STREAMING GATEWAY

CROSS-REFERENCE TO RELATED APPLICATIONS

This application claims benefit under 35 U.S.C. § 119 (e) of U.S. Provisional Application No. 60/605,994, filed Aug. 31, 2004, which is incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to multiplex communications and to interactive video distribution systems and, more particularly, to channel assignment techniques, to user-requested video program system, and to video distribution system components.

Boutique content is a problem for network operators. Boutique content is requested by only a few subscribers. Some content, such as CNN or ESPN, have broad popularity. Other content, however, is less popular and only requested by a few subscribers. This lesser popular boutique content may potentially consume valuable multicast IP address space and rely on more time consuming multicast processes on behalf of a small number of subscribers who may be more effectively served via unicast mechanisms. Conversely, highly time-dependent boutique content may cause congestion events in the network as video servers attempt to satisfy video on demand requests of such boutique content at nearly the same time for a large number of subscribers. The cost of transport for this boutique content is seldom recovered, and the time required to join and leave such multimedia streams may exceed latency parameters necessary for an ordered Quality of Experience (QoE).

The typical solution to boutique congestion is more bandwidth. That is, network operators "throw bandwidth at the problem" by over-provisioning the network in order to accommodate bandwidth-intensive applications. As Internet Protocol video is contemplated as a service offering, the proper handling of streaming media in a general purpose transport network will be very difficult to achieve and/or expensive to solve through over-provisioning. What is needed, then, is an intelligent and novel solution to boutique content congestion.

SUMMARY

The exemplary embodiments address the above needs and other needs by intelligently translating between streaming formats. The exemplary embodiments allow for multimedia streams to be conveyed in the manner most economical to the network operator, both in terms of bandwidth consumed in network links and elements and in terms of the latency budget for joining and leaving said streams in support of acceptable QoE.

The exemplary embodiments provide a novel technology for successfully managing traffic in the broadband network. As the network is leveraged to serve the disparate requirements of IP voice, video, and data, network links should remain uncongested and queues should be cleared in order to support Quality of Service (QoS), Class of Service (CoS), and QoE. The exemplary embodiments mediate the streaming protocol by which a given piece of content is delivered, ensuring that it consumes a minimum amount of bandwidth in the network as a whole and minimizing the stream join and leave latency as subscribers change streams (or channels).

The exemplary embodiments may be constructed as a stand-alone device or as a feature of another routing platform. In either implementation, the exemplary embodiments accept multimedia streams from a number of sources, determine the most efficacious method of IP delivery for each, and forward the streams through a transport network in that most efficacious manner. The exemplary embodiments will also have access to network statistical data in order to properly classify each stream. Manual configuration on behalf of specific streaming sources is also supported.

The exemplary embodiments accept streams that are unicast (RTSP, SIP, etc.), multicast (PIM-SM, DVMRP, IGMP, etc.), or broadcast (PIM-DM, etc.). The exemplary embodiments then output streams of the same or different streaming method. The output streaming method decision will be based on demand for the stream in the network as a whole and instantaneously in a node. Content in high demand, whether originally unicast, multicast or broadcast, will be multicast as output. Content of any streaming type in low demand will be unicast as output.

The exemplary embodiments optimize streaming type while recognizing stream (channel) change latency. The exemplary embodiments provide an optimization of streaming type based on network persistence. A stream that is persistent in the network, or mostly so, will be output as multicast such that downstream multicasting nodes may perform stream (channel) change functionality. A stream that is sparsely present in the network, even if a traditional broadcast or multicast stream will be unicast as output to minimize the latency in joining the stream in the subscriber's perception. A unicast stream may also be left immediately, further relieving the network in the presence of sparsely present streams. Leave latency directly impacts available bandwidth in both the transport network links and in the subscriber's last mile connection.

One such exemplary embodiment describes a method of intelligently translating between streaming protocols. A multimedia stream of data is received, and the multimedia stream of data has a streaming protocol. Network control data is also received, and this network control data indicates a level of demand for the multimedia stream of data. The multimedia stream of data is translated to a different streaming protocol to reduce bandwidth and forwarded to a transport network.

Another of the exemplary embodiments describes a system for intelligently translating between streaming protocols. The system comprises a communications module stored in a memory device, and a processor communicates with the memory device. The communications module receives a multimedia stream of data, with the multimedia stream of data having a streaming protocol. The communications module also receives network control data indicating a level of demand for the multimedia stream of data. The communications module translates the multimedia stream of data to a different streaming protocol to reduce bandwidth and forwards the translated multimedia stream of data to a transport network.

Still more exemplary embodiments describe a computer program product. The computer program product is a computer-readable medium and a communications module stored on the computer-readable medium. The communications module comprises computer-readable instructions for intelligently translating between streaming protocols. The communications module receives a multimedia stream of data, with the multimedia stream of data having a streaming protocol. The communications module also receives network control data indicating a level of demand for the multimedia stream of data. The communications module translates the multimedia stream of data to a different streaming protocol to reduce bandwidth and forwards the translated multimedia stream of data to a transport network.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the exemplary embodiments.

DESCRIPTION OF THE DRAWINGS

These and other features, aspects, and advantages of the embodiments are better understood when the following Detailed Description is read with reference to the accompanying drawings, wherein.

DESCRIPTION OF THE EXEMPLARY EMBODIMENTS

Figure 1:
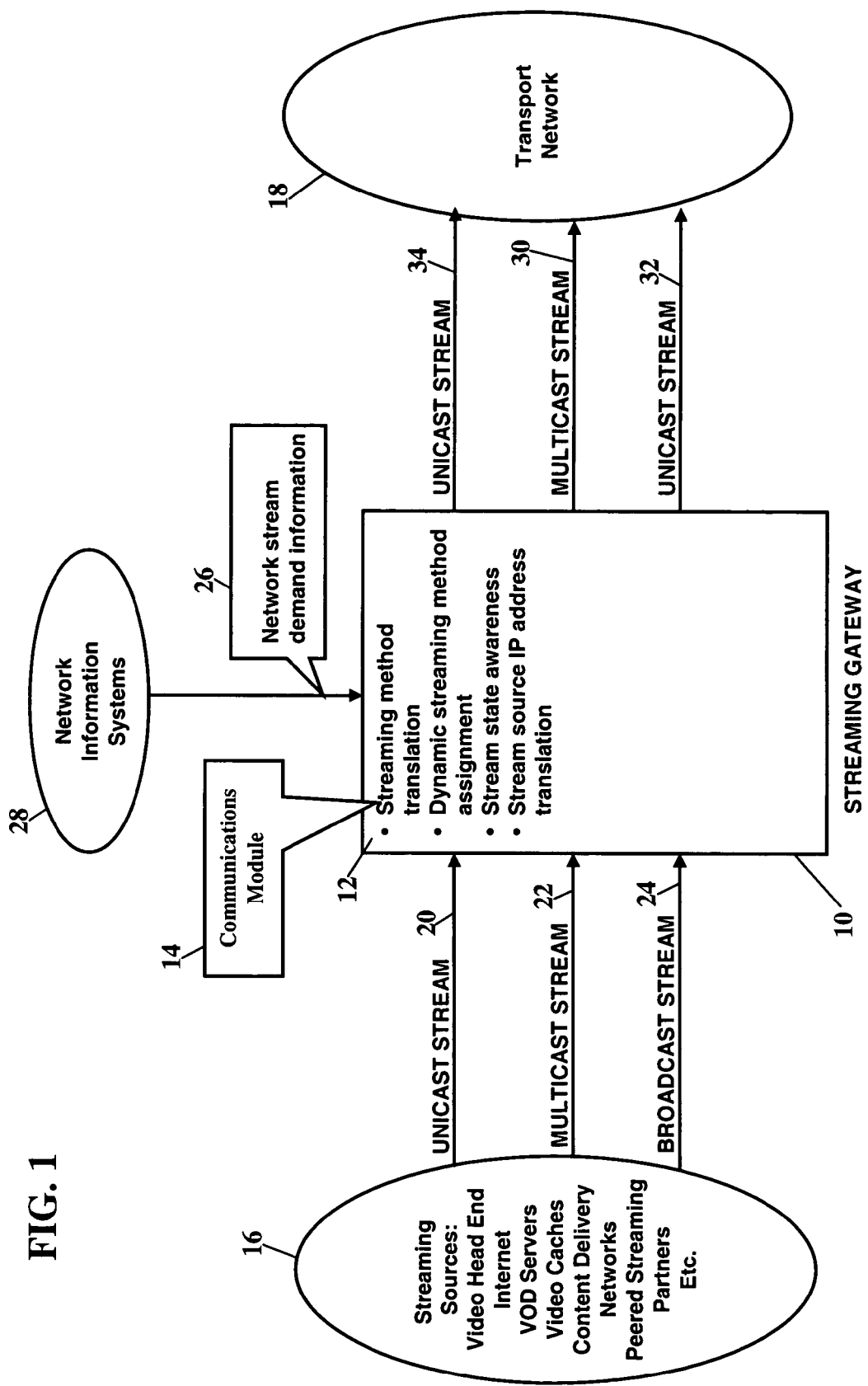
FIG. 1 illustrates an operating environment for the exemplary embodiments.

The exemplary embodiments now will be described more fully hereinafter with reference to the accompanying drawings, in which exemplary embodiments are shown. The exemplary embodiments may, however, be embodied in many different forms and should not be construed as limited to the embodiments set forth herein. These embodiments are provided so that this disclosure will be thorough and complete and will fully convey the scope of the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments intelligently translate between streaming formats. The exemplary embodiments allow for multimedia streams to be conveyed in the manner most economical to the network operator, both in terms of bandwidth consumed in network links and elements and in terms of the latency budget for joining and leaving said streams in support of acceptable QoE. The exemplary embodiments translate among IP streaming types by maintaining state awareness of streams and stream types in a transport network. The exemplary embodiments dynamically assign stream characteristics based on data from network information systems and translate multimedia stream source IP addresses between public space and private or reserved space and of the necessary subnet, namely, the multicast addressing subnet. The exemplary embodiments mediate the streaming protocol by which a given piece of content is delivered, ensuring that it consumes a minimum amount of bandwidth in the network as a whole and minimizing the stream join and leave latency as subscribers change streams (or channels).

FIG. 1 illustrates an operating environment for some of the exemplary embodiments. FIG. 1 illustrates a streaming gateway 10. The streaming gateway 10 is a computer system 12 that stores a communications module 14. The communications module 14 is a computer-readable program that translates IP addresses between streaming content sources 16 and a transport network 18. The transport network 18 may be a cable network operating in the radio-frequency domain and/or the Internet Protocol (IP) domain. The transport network 18, however, may also include a distributed computing network, such as the Internet (sometimes alternatively known as the "World Wide Web"), an intranet, a local-area network (LAN), and/or a wide-area network (WAN). The transport network 18 may include coaxial cables, copper wires, fiber optic lines, and/or hybrid-coaxial lines. The transport network 18 may even include wireless portions utilizing any portion of the electromagnetic spectrum and any signaling standard (such as the I.E.E.E. 802 family of standards).

As FIG. 1 shows, the streaming gateway 10 receives various inputs. The streaming gateway 10 receives inputs from the streaming content sources 16. The streaming content sources 16 may include a video head end, the Internet, video-on-demand servers, video caches, content delivery networks, content partners, and any other multimedia content from any source. The streaming gateway 10 receives an input stream from the streaming content sources 16, and that input may be a unicast stream 20, a multicast stream 22, or a broadcast stream 24. The streaming gateway 10 also receives a network information system input 26 from a network information system 28. The network information system input 26 provides information as to requests or demands for content from subscribers.

The streaming gateway 10 then performs a translation. The streaming gateway 10 analyzes the network information system input 26 and determines whether a particular streaming content source 16 should be translated into a different stream format. That is, whether highly demanded content, delivered in a unicast format, should be translated and output as a multicast stream 30 or as a broadcast stream 32 such that downstream multicasting nodes may perform stream (channel) change functionality. The streaming gateway 10, however, also determines whether an unpopular streaming content source, delivered as the multicast stream 22 or the broadcast stream 24, should be translated and output as a unicast stream 34 to minimize the latency in joining the stream in the subscriber's perception. The streaming gateway 10 thus accepts multimedia streams from a number of sources, determines the most efficient and/or economical distribution method based upon demand and bandwidth, and then forwards the streams through the transport network in that most efficacious manner. This method recognizes the time dependency of some streams' (channels') popularity. E.g., children's programming may be multicast during daytime and early evening while unicast during late evening and night times.

The streaming gateway 10 may utilize a control plane. The streaming gateway 10 receives the network information system input 26 from the network information system 28. The network information system input 26 provides information as to requests or demands for content from subscribers. The network information system 28 gathers demand data on what channels are in use and on what streams are in use. The network information system 28 may extract demand data from the transport network 18. If that demand data is presented to streaming gateway 10, then the streaming gateway 10 can dynamically act to shift content between multicast, broadcast, and uni-cast domains in order to optimize the transport network 18.

The network information system input 26 is received from a control plane. The transport network 18 has both a bearer plane and a control plane. The bearer plane transports data traffic, while the control plane rides above bearer plane and links into the network elements. Because the control plane links to the network elements, the control plane can control the network elements with management systems. The control plane can also extract information from the network elements concerning performance and alarm data (such as outages and troubles). The control plane can also extract statistics to manage capacity and monitor other transmission performances.

The network information system input 26 is received from the control plane. The network information represents demand data from network elements that perform multicast replications. A digital subscriber line access multiplexer (DSLAM), access nodes, and/or multicast replication routers provide this demand data. The demand data may have any form, such as a summary listing of channels in use. The demand data may be pulled for any time increment. The demand data, for example, may be received in real time as each channel is requested or dropped. The demand data is received, processed, and acted upon by the streaming gateway 10.

The streaming gateway 10 may translate according to a threshold. The threshold indicates the number of users assigned to a digital subscriber line access multiplexer. If the number of users is greater than the threshold, then the multimedia stream of data is translated to a multicast streaming protocol. If, however, the number of users is less than the threshold, then the multimedia stream of data is translated to a uni-cast streaming protocol. This threshold saves a lot of processing in the network elements, and helps the network elements better perform.

The network information system input 26 also informs the streaming gateway 10 of stream demand in local nodes or aggregation hierarchies. Aggregation hierarchies are distributions of access network elements, such as digital subscriber line access multiplexers and access nodes to the network. In a cable distribution system the aggregation hierarchies could include a cable modem termination system that enables cable modems to send and receive packets of data. The aggregation hierarchies could also include Ethernet switches having multicast capability and/or aggregation routers. These aggregation routers are IP routing platforms at the head of the chain of access nodes that serve given geographies.

Figure 2:
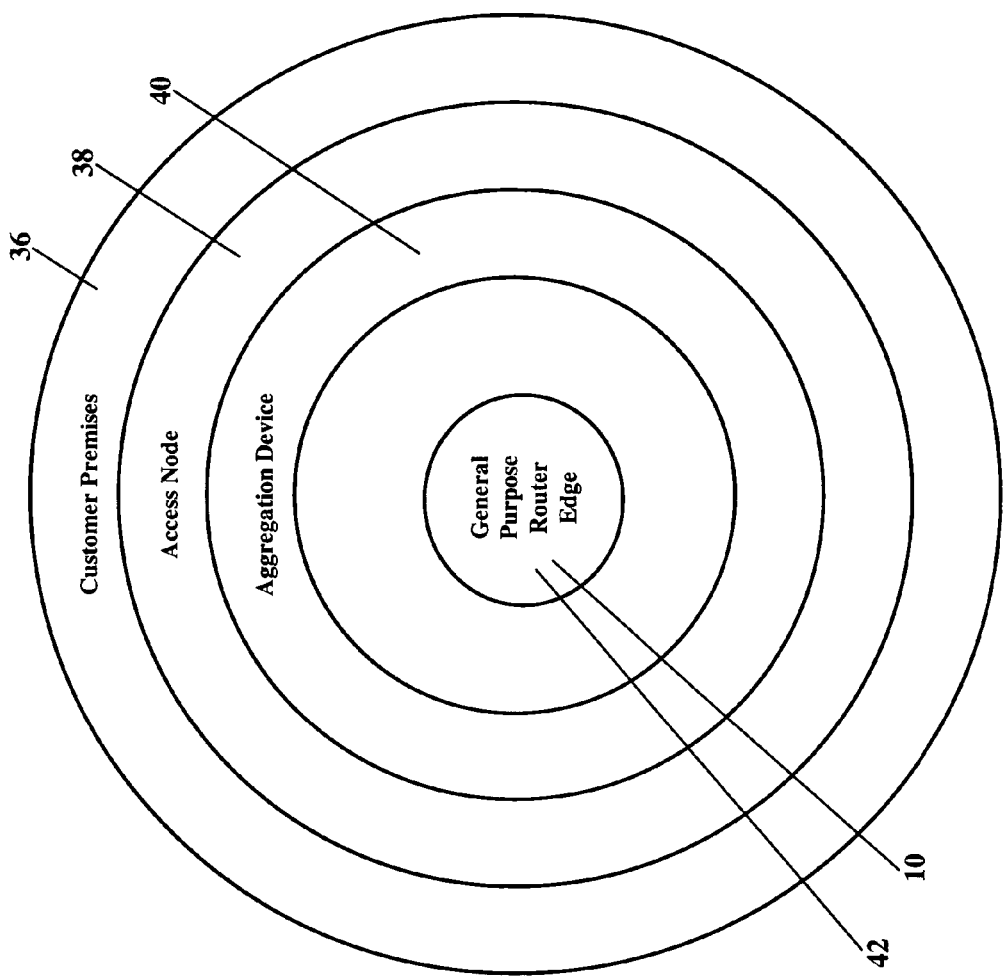
FIG. 2 is an alternate architectural representation of an operating environment for the exemplary embodiments.

FIG. 2 is an alternate architectural representation of an operating environment for the exemplary embodiments. Here the architectural representation resembles a series of concentric circles. An outer most ring 36 operates as a router or residential gateway in a subscriber's premises. A next inner circle 38 is an access node, such as DSL and/or fiber optic, providing access to a network. A further inner circle 40 is an aggregation device, and an innermost circle 42 is general-purpose router edge. This innermost position 42 is preferably where the streaming gateway 10 would logically operate within this alternate operating environment. This alternate operating environment may be used to implement data services, cable services, video-on-demand services, IP television services, and other multimedia.

The methods and systems of the exemplary embodiments could be embodied in a general purpose router. The methods and systems could also be implemented as software or as embedded circuitry. The methods and systems could also be implemented as a specialized stand-alone device, such as mediating content directly from a video head end into a distribution network. The streaming gateway 10 may itself determine whether any content coming into the gateway 10 should be further distributed into the transport network 18 as the unicast stream 34, as the multicast stream 30, or as the broadcast stream 32. This translation formatting depends upon how broadly the streaming content source 16 is requested and economies of usage in network links and switching/routing devices. The streaming gateway 10 can reformat multicast stream IP addresses and distribute as unicast stream in the transport network 18. The streaming gateway 10 can also receive data from a control plane to have an awareness of the transport network 18 and make discrete decisions on a stream-by-stream basis as to whether the more efficient/economical distribution method is unicast, multicast, or broadcast.

An example helps explain the translation. Suppose a multicast streaming source, such as "The Cat Fancier Channel," is distributed to a particular demographic where cat fanciers are rare. The service provider would best distribute the channel as a unicast stream because multicasting adds channel change latency, and the latency may be about three seconds. Subscribers often feel channel change times of more than 1.2 seconds is annoying, and recent studies suggest that some subscribers may even have a negative impression of picture quality based solely upon the amount of time the network takes to change to a desired channel. Experiments show that when channel change latency times are varied, but encoding remains constant, viewers give entirely different experiential responses. Channel change latency is a sensitive issue, and the streaming gateway 10 helps address channel change latency. The streaming gateway 10 recognizes statistical demand for content in networks and, more specifically, for given access nodes at the edge of the network 18. The streaming gateway 10 can make a specific decision as to whether a unicast, multicast, or broadcast stream is required. If a channel is requested at nearly all hours of every day (such as ESPN, for example), that channel is on-demand by at least one subscriber in every node in the network. That channel, then, is more efficiently distributed as a multicast stream. Only one copy of that content need be flooded between general purpose router edge (shown as reference numeral 42 in FIG. 2) and the aggregation device edge 40 in order to propagate that content throughout distribution network 18. The multicast stream more efficiently utilizes resources within the general purpose router edge 40, and the multicast stream makes more economical use of network links between the aggregation edge 40 and the access node edge 38. Many more popular channels may be offered, while consuming a minimum amount of network resources. Because popular content is joined to a multicast group all the way down at the access node 38, the channel change requests are immediately satisfied by the serving access node. Channel change latency is not overly poor from a subscriber's perspective. When the subscriber eventually changes from the "The Cat Fancier Channel" to a popular channel (again perhaps ESPN), the channel change latency is perceived as low. The multicast request for the popular content need not be propagated to the core of the network—the access node 38 itself can provide the requested popular content. The streaming gateway 10 thus optimizes timing by translating streaming formats to suit demand.

On the other hand, the streaming gateway 10 can affect channel change experiences. The streaming gateway 10 is able to recognize that instantiating "The Cat Fancier Channel" (or any other less popular content) to a particular subscriber can affect a nearly instantaneous channel change experience if the content starts as a unicast stream, even from the core of the network. If the streaming gateway 10 recognizes that a particular content, whether multicast or broadcast, would actually produce a better subscriber experience as a unicast stream, the streaming gateway 10 shifts the IP header of the content out of the multicast address space and streams the content to the subscriber as the unicast stream 34. The streaming gateway 10 is also useful for streaming out content from application/service provider networks. Content could be sourced from the Internet domain, as these sources are termed application/service providers. These providers may offer content as multicast streams and/or as unicast streams.

Webcasting provides another example. Webcasted content may be real time popularly requested content in a demographic. In other words, those subscribers are expected to simultaneously watch that webcast content. The source for this webcast content would be streamed into the network on a unicast basis. If that webcast content were popular, the unicast stream would flood the network 18 with essentially lots of copies of the same content. The network would be flooded with a multiplicity of streams with concurrency in time. The content could be more efficiently/economically distributed as a multicast stream. Victoria's Secret, for example, often webcasts a live and very popular fashion show. The network operator need not replicate thousands of unicast streams—rather the network operator could accept a single stream into the streaming gateway 10. The streaming gateway 10 would recognize its popularity and its concurrency in time and distribute into the network as a multicast stream. The streaming gateway 10 would translate the IP addresses and economically cascade the content.

A ring topology provides another example. Instead of a tree-and-branch network hierarchy, in a ring topology the serving nodes appear as drop-points along a ring. Instead of logically overlaying with a tree-and-branch multicast hierarchy, content may be broadcast to nodes along the ring. Every access node, in essence, is listening to all channels and understands which channels are in real-time demand by subscribers attached to the access node. The access node then multicasts that content from the broadcast ring and down to the subscriber. The application/content service providers may be streaming content as a function of their server topology and/or their ability to stream in unicast or multicast formats. The streaming gateway 10 mediates that content into a broadcast context. The streaming gateway 10 recognizes that the topology it's serving in the distribution network is broadcast in nature, and this particular content has high demand to warrant its broadcast into that ring topology. In order to broadcast that content into that ring topology, the streaming gateway 10 translates/converts the format of the input stream (either multicast or unicast) into the broadcast stream 32.

Still another example involves content with a regional interest. The content is popular within a region, but the content has lesser national interest. Some sporting events, for example, have broad regional appeal but lesser national appeal. Most college football programming tends to have regional allegiances, and NASCAR content has strong popularity in the southeastern United States. Websites providing college football and/or NASCAR content might provide unicast streams, yet the network operator may not want the network regionally flooded with a multiplicity of unicast streams. The network operator may instead wish the streaming gateway 10 to distribute that regionally popular content to the access nodes 38 as the broadcast stream 32 along the ring topology.

The streaming gateway 10 also provides a management link. The streaming gateway 10 receives specific commands as to whether to deliver unicast or multicast or broadcast streams into the network 18. The streaming gateway 10 may receive operator-selectable commands to perform static translations. The streaming gateway 10, however, may gather statistics from the access nodes 38 and threshold demand. The streaming gateway 10 may feed, communicate, and/or send the access node statistics to a management link and make decisions as whether unicast is best for reduced channel change latency or whether multicast is preferred for economy of bandwidth.

The streaming gateway 10 lends itself to business corollaries. First, the device supports ala carte programming. The streaming gateway 10 recognizes that some channels/content are more popular than others. If the streaming gateway 10 receives content from a traditional video head end, all that content would ordinarily be broadcast down into the aggregation network. The streaming gateway 10, however, recognizes the lesser-demanded content and seeks to efficiently place popular content in time slots. Bandwidth resources are not overly consumed by less popular content.

The streaming gateway 10 also allows effective use of bandwidth for servicing non-video applications. The network operator may wish to reserve bandwidth for non-video services such as Voice over Internet Protocol (VoIP) telephony, data transfer, and any other Internet service. The streaming gateway 10 minimizes bandwidth consumed by video content at any given point in time. Subscribers can now choose to only subscribe to the channels they will ever desire (perhaps twenty channels or less). The statistical demand for any one channel or group of simultaneous channels is reduced. Depending upon whether the content is standard definition or high-definition, the streaming gateway 10 can save 300 Mb to 1.6 Gb of bandwidth by substantiating an ala carte subscription basis. The streaming gateway 10 allows the network operator to have a fine grain view of the network 18 and thereby support an ala carte business model. The network operator can then multicast only those channels into a particular distribution topology that are under constant subscription and, therefore, nearly constantly required by the access nodes 38. Any less popular channels would be instantiated to a subscriber as a unicast stream. The network operator also achieves channel change latency efficiency that will be important for boutique content.

Another business corollary involves video-on-demand. The streaming gateway 10 allows a network operator to better leverage video-on-demand as a content delivery platform. Video-on-demand today, by its very nature, is provided via a unicast stream. Video-on-demand is non-time dependent and non-simultaneously requested by individual subscribers. The streaming gateway 10, however, recognizes content that is best multicast. The network can now correlate content to simultaneous requests and/or usage. Even if many users request the content in variable time, in the aggregate, however, requests will be seen as simultaneous or nearly simultaneous. The network operator will then see behavior that is better served by multicast streams. When the network operator sees many subscribers all requesting the same content within seconds of time, the network operator can use known packet generalization technologies to allow many users to tune to the same multicast stream despite varying times. The multicast distribution achieves greater economies of scale within the network.

Still another business corollary allows the network operator to better define the relationship with third party content providers. The network operator better understands demand for a particular content, the simultaneity of demand for that content, and thus the cost basis for that content. The network operator and the content provider are better able to establish least-cost basis pricing for the content and for the network. The streaming gateway 10 provides fine grain control over resource requirements within the network to better control costs to the network operator and price to the content providing partner.

Figure 3:
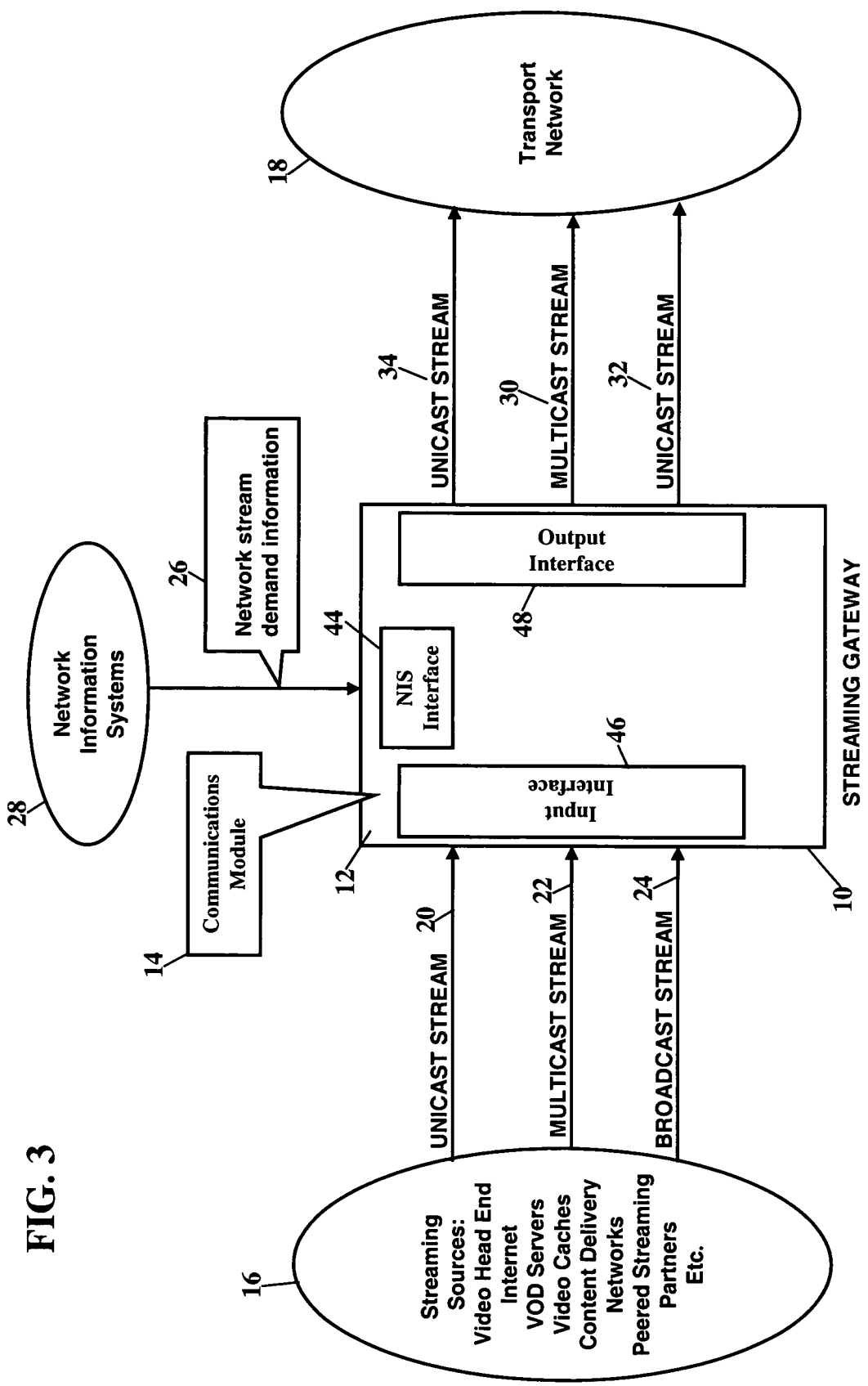
FIG. 3 illustrates various interfaces according to the exemplary embodiments.

FIG. 3 illustrates various interfaces. An NIS interface 44 provides an interface to the network information system 24. The NIS interface 44 supports many protocols. XML, COPS, CORBA, SNMP are all standard network control information protocols which are supportable by the streaming gateway. The streaming gateway can accept data formatted in any of these protocols, and the streaming gateway can be programmed or built to accept any other protocol.

The streaming gateway 10 may also have an input interface 46 and an output interface 48. The input interface 46 and the output interface 48 may support any streaming protocol. TCP/IP is supported along with a variety of multicasting protocols. The streaming gateway 10 may function as an IGMP router, a PIM router in either sparse mode or dense mode implementations, and/or a DVMRP multicasting protocol. The streaming gateway 10 may also provide streaming convergence across distribution networks and participate in spanning for Ethernet when interfacing with transport networks. The input 46 and output 48 interfaces may be slow interfaces (such as 45 megabit STS1 and DS3) to gigabit interfaces and could be formatted as ATM, Ethernet, packet over SONET, frame relay, or any other format. An IP layer would support the streaming protocol. The physical input and output interfaces could be a SONET multiplexer, an ATM switch, an Ethernet switch, and/or a general purpose router. The NIS interface could also accept the same physical interfaces.

Figure 4:
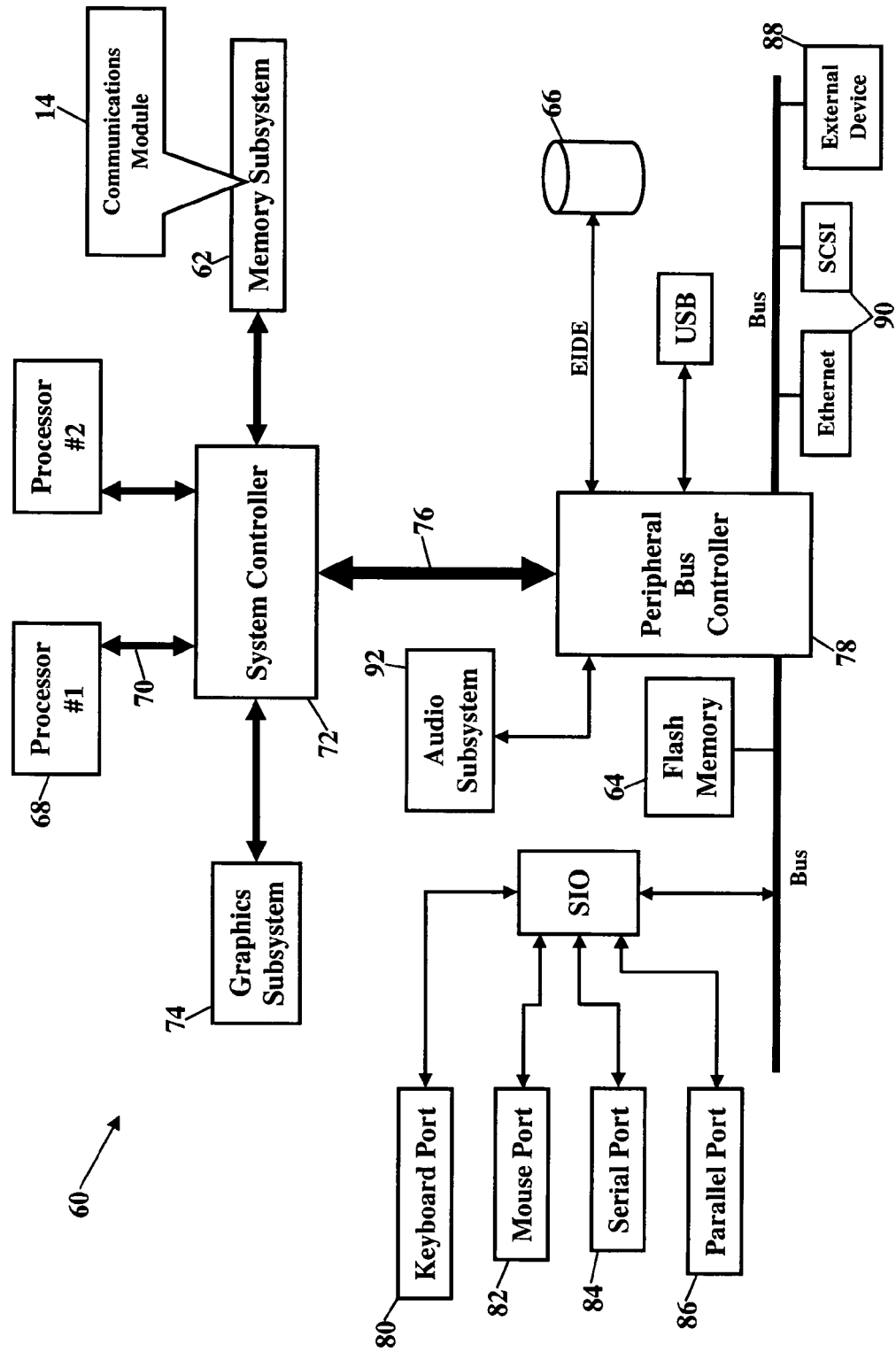
FIG. 4 depicts another possible operating environment for the exemplary embodiments.

FIG. 4 depicts another possible operating environment for the exemplary embodiments. FIG. 4 is a block diagram showing the communications module 14 residing in a computer system 60. The computer system 60 may be any computing system, such as the streaming gateway 10 (shown as reference numeral 10 in FIGS. 1-3), a router/switch/hub/gateway/proxy, or any other computer device. As FIG. 4 shows, the communications module 14 operates within a system memory device. The communications module 14, for example, is shown residing in a memory subsystem 62. The communications module 14, however, could also reside in flash memory 64 or a peripheral storage device 66, or in firmware or hardware, or in any combination. The computer system 60 also has one or more central processors 68 executing an operating system. The operating system, as is well known, has a set of instructions that control the internal functions of the computer system 60. A system bus 70 communicates signals, such as data signals, control signals, and address signals, between the central processor 68 and a system controller 72 (typically called a "Northbridge"). The system controller 72 provides a bridging function between the one or more central processors 68, a graphics subsystem 74, the memory subsystem 62, and a PCI (Peripheral Controller Interface) bus 76. The PCI bus 76 is controlled by a Peripheral Bus Controller 78. The Peripheral Bus Controller 78 (typically called a "Southbridge") is an integrated circuit that serves as an input/output hub for various peripheral ports. These peripheral ports are shown including a keyboard port 80, a mouse port 82, a serial port 84 and/or a parallel port 86 for a video display unit, one or more external device ports 88, and networking ports 90 (such as SCSI or Ethernet). The Peripheral Bus Controller 78 also includes an audio subsystem 92. Those of ordinary skill in the art understand that the program, processes, methods, and systems described in this patent are not limited to any particular computer system or computer hardware.

Those of ordinary skill in the art also understand the central processor 68 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

A preferred operating system, according to an exemplary embodiment, is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 62, flash memory 64, or peripheral storage device 66) may also contain an application program. The application program cooperates with the operating system and with a video display unit (via the serial port 84 and/or the parallel port 86) to provide a Graphical User Interface (GUI). The Graphical User Interface typically includes a combination of signals communicated along the keyboard port 80 and the mouse port 82. The Graphical User Interface provides a convenient visual and/or audible interface with a user of the computer system 60.

Figure 5:
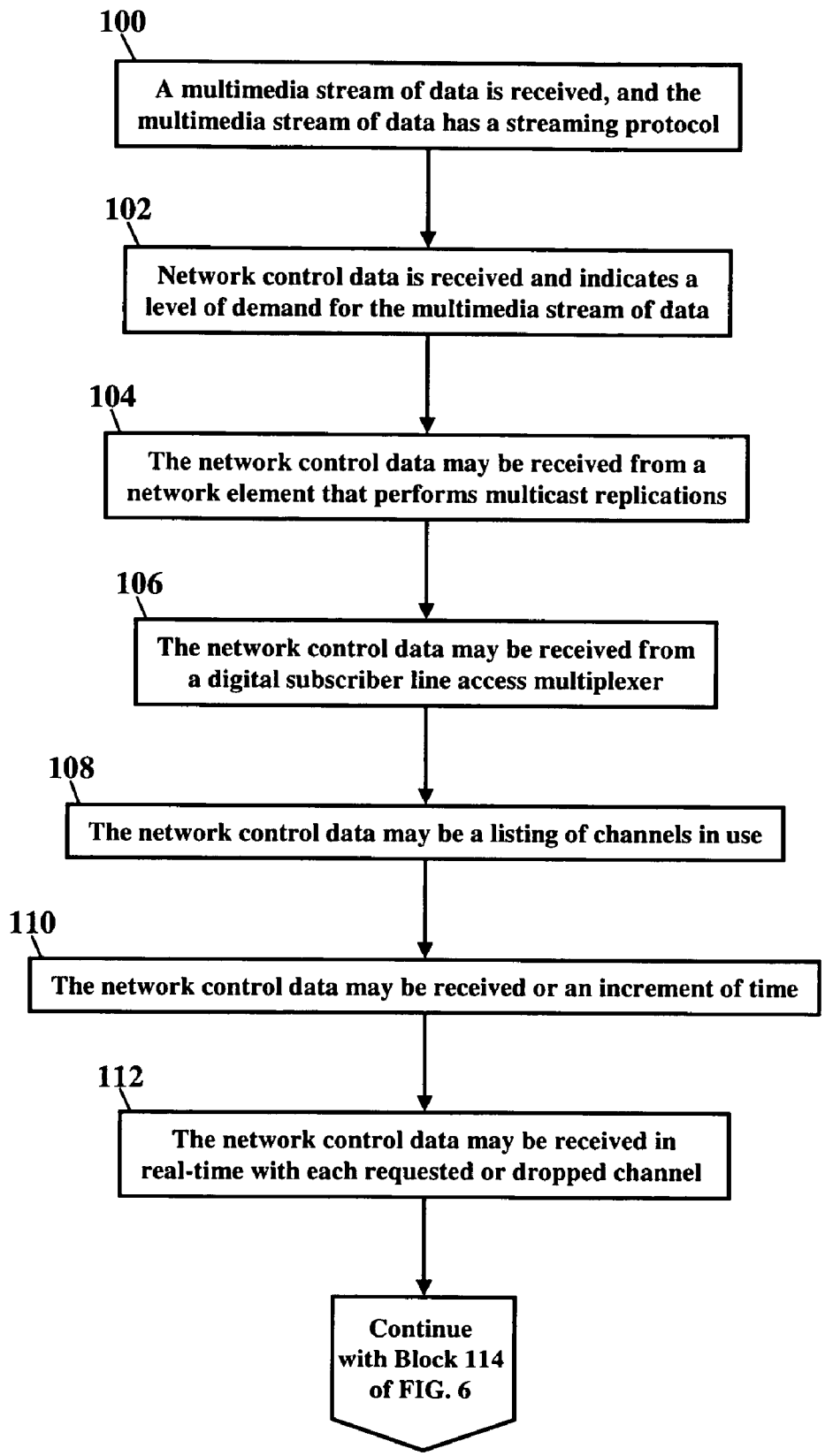
FIGS. 5 and 6 are flowcharts illustrating a method of intelligently translating between streaming protocols.
Figure 6:
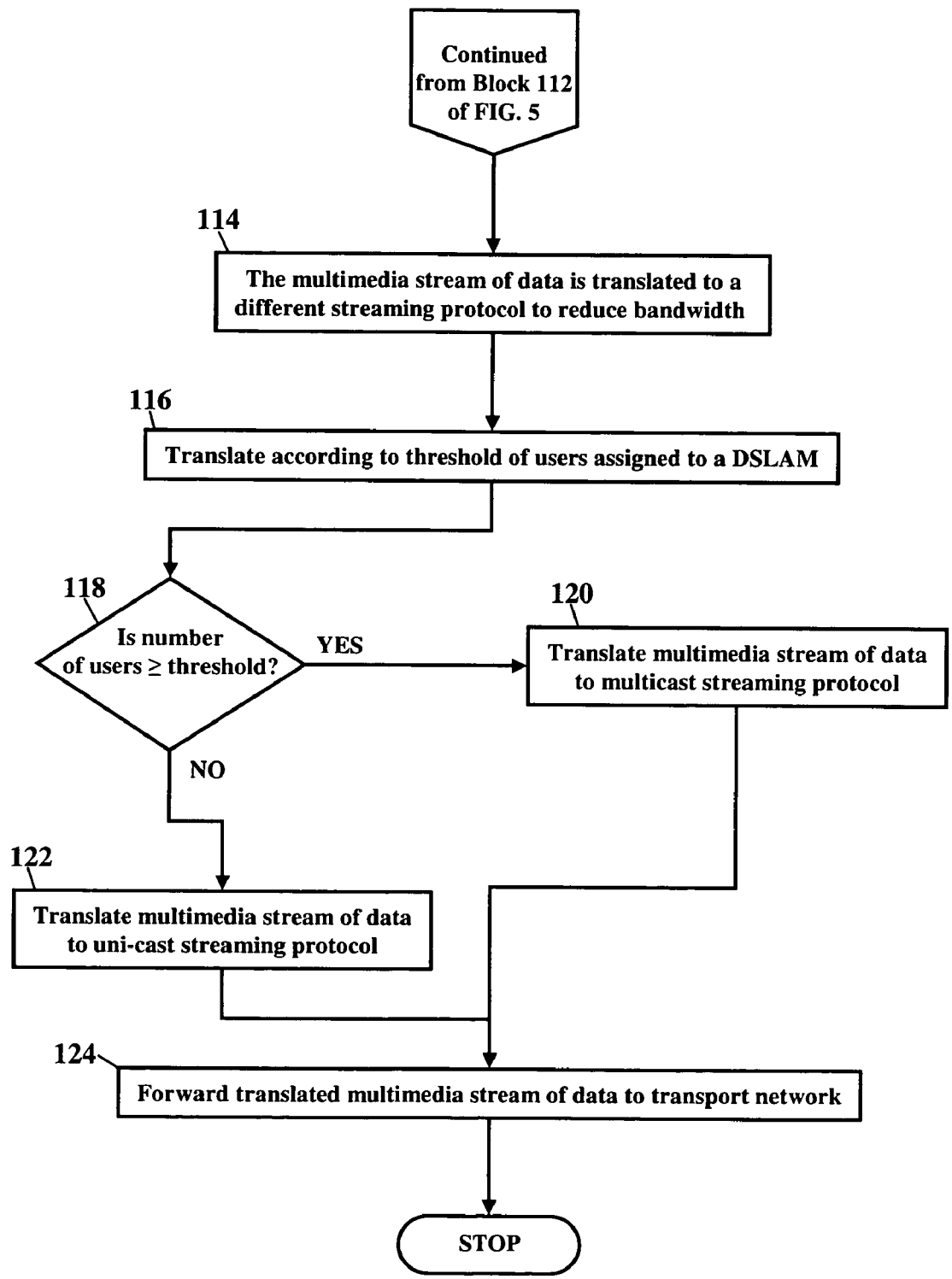

FIGS. 5 and 6 are flowcharts illustrating a method of intelligently translating between streaming protocols. A multimedia stream of data is received, and the multimedia stream of data has a streaming protocol (Block 100). Network control data is received and indicates a level of demand for the multimedia stream of data (Block 102). The network control data may be received from a network element that performs multicast replications (Block 104). The network control data may be received from a digital subscriber line access multiplexer (Block 106). The network control data may be a listing of channels in use (Block 108). The network control data may be received or an increment of time (Block 110). The network control data may be received in real-time with each requested or dropped channel (Block 112).

The flowchart continues with FIG. 6. The multimedia stream of data is translated to a different streaming protocol to reduce bandwidth (Block 114). The multimedia stream of data may be translated according to a threshold of users assigned to a digital subscriber line access multiplexer (Block 116). If the number of users is greater than the threshold (Block 118), then the multimedia stream of data is translated to a multicast streaming protocol (Block 120). If, however, the number of users is less than the threshold (Block 118), then the multimedia stream of data is translated to a uni-cast streaming protocol (Block 122). The translated multimedia stream of data is then forwarded to a transport network (Block 124).

The communications module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the call center application to be easily disseminated. A computer program product comprises the communications module stored on the computer-readable medium. The communications module comprises computer-readable instructions for intelligently translating between streaming protocols. The communications module receives a multimedia stream of data, with the multimedia stream of data having a streaming protocol. The communications module also receives network control data indicating a level of demand for the multimedia stream of data. The communications module translates the multimedia stream of data to a different streaming protocol to reduce bandwidth and forwards the translated multimedia stream of data to a transport network.

The communications module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of intelligently translating between streaming protocols, the method comprising:
   receiving a multimedia stream of data, the multimedia stream of data having a streaming protocol;
   receiving network control data indicating a level of demand for the multimedia stream of data, the network control data indicating a number of users demanding the multimedia stream of data;
   translating the multimedia stream of data to a different streaming protocol to reduce bandwidth; and
   forwarding the translated multimedia stream of data to a transport network;
   wherein translating the multimedia stream of data is performed according to a threshold of users assigned to a digital subscriber line access multiplexer,
   wherein if the number of users is greater than the threshold, then the multimedia stream of data is translated to a multicast streaming protocol, and
   wherein if the number of users is less than the threshold, then the multimedia stream of data is translated to a uni-cast streaming protocol;
   wherein translating the multimedia stream of data includes determining a time of day dependency of popularity of the multimedia stream in determining to multicast or unicast the multimedia stream;
   wherein network control data is received from a network element that performs multicast replications, the network control data is received from a digital subscriber line access multiplexer, the network control data includes a listing of channels in use received in real-time with each requested or dropped channel.

2. A method according to claim 1, wherein receiving the network control data comprises receiving demand data from a network element that performs multicast replications.

3. A method according to claim 1, wherein receiving the network control data comprises receiving demand data from a digital subscriber line access multiplexer.

4. A method according to claim 1, wherein receiving the network control data comprises receiving a listing of channels in use.

5. A method according to claim 1, wherein receiving the network control data comprises receiving the network control data for an increment of time.

6. A method according to claim 1, wherein receiving the network control data comprises receiving the network control data in real-time with each requested or dropped channel.

7. A system for intelligently translating between streaming protocols, the system comprising:
   a communications module stored in a memory device, and a processor communicating with the memory device;
   the communications module receiving a multimedia stream of data, the multimedia stream of data having a streaming protocol, receiving network control data indicating a level of demand for the multimedia stream of data, the network control data indicating a number of users demanding the multimedia stream of data, translating the multimedia stream of data to a different streaming protocol to reduce bandwidth, and forwarding the translated multimedia stream of data to a transport network;

wherein the communications module translates the multimedia stream of data according to a threshold of users assigned to a digital subscriber line access multiplexer, wherein if the number of users is greater than the threshold, then the multimedia stream of data is translated to a multicast streaming protocol, and wherein if the number of users is less than the threshold, then the multimedia stream of data is translated to a uni-cast streaming protocol;

wherein translating the multimedia stream of data includes determining a time of day dependency of popularity of the multimedia stream in determining to multicast or unicast the multimedia stream;

wherein network control data is received from a network element that performs multicast replications, the network control data is received from a digital subscriber line access multiplexer, the network control data includes a listing of channels in use received in real-time with each requested or dropped channel.

8. A system according to claim 7, wherein the communications module receives demand data from a network element that performs multicast replications.

9. A system according to claim 7, wherein the communications module receives demand data from a digital subscriber line access multiplexer.

10. A system according to claim 7, wherein the communications module receives a listing of channels in use.

11. A system according to claim 7, wherein the communications module receives the network control data for an increment of time.

12. A system according to claim 7, wherein the communications module receives the network control data in real-time with each requested or dropped channel.

13. A computer program product, comprising:

a non-transitory computer-readable medium; and a communications module stored on the non-transitory computer-readable medium, the communications module comprising computer-readable instructions for intelligently translating between streaming protocols, the communications module performing:

receiving a multimedia stream of data, the multimedia stream of data having a streaming protocol;

receiving network control data indicating a level of demand for the multimedia stream of data, the network control data indicating a number of users demanding the multimedia stream of data;

translating the multimedia stream of data to a different streaming protocol to reduce bandwidth; and forwarding the translated multimedia stream of data to a transport network;

wherein the communications module comprises computer-readable instructions for translating the multimedia stream of data according to a threshold of users assigned to a digital subscriber line access multiplexer, wherein if the number of users is greater than the threshold, then the multimedia stream of data is translated to a multicast streaming protocol, and wherein if the number of users is less than the threshold, then the multimedia stream of data is translated to a uni-cast streaming protocol;

wherein translating the multimedia stream of data includes determining a time of day dependency of popularity of the multimedia stream in determining to multicast or unicast the multimedia stream;

wherein network control data is received from a network element that performs multicast replications, the network control data is received from a digital subscriber line access multiplexer, the network control data includes a listing of channels in use received in real-time with each requested or dropped channel.

14. A computer program product according to claim 13, wherein the communications module comprises computer-readable instructions for receiving demand data from a network element that performs multicast replications.

15. A computer program product according to claim 13, wherein the communications module comprises computer-readable instructions for receiving demand data from a digital subscriber line access multiplexer.

16. A computer program product according to claim 13, wherein the communications module comprises computer-readable instructions for receiving a listing of channels in use.

17. A computer program product according to claim 13, wherein the communications module comprises computer-readable instructions for receiving the network control data for an increment of time.

* * * * *